Patented Jan. 30, 1951

2,539,485

UNITED STATES PATENT OFFICE 2,539,485

RECOVERY OF MANGANESE FROM COMPOUND SILICATE MATERIAL

Robert A. Schoenlaub, Cleveland, Ohio, assignor to Sylvester & Company, Cleveland, Ohio, a corporation of Ohio No Drawing. Application April 9, 1949, Serial No. 86,603

9 Claims. (Cl. 75—1)

In working up compound silicate materials which contain calcium, iron, and manganese, I have found that manganese can be recovered to particular advantage. And, in fact, low-grade manganese sources which involve fundamental combinations of calcium and iron may be worked up to yield profitable amounts of manganese. In addition to natural ore and mineral sources of such compound silicates, there are also applicable slags such as from open hearth steel making.

Manganese is such an essential component of steel and its principal sources are so remote that such a process is economically desirable. Furthermore, if manganese can be easily recovered, more manganese can be carried in a slag, thus greatly facilitating the operation of making steel in the open hearth.

Manganese is a very difficult substance to extract from low-grade materials. It tends to have a greater affinity for the individual chemical constituents of such a material than the chemical constituents have for each other. Also, manganese resists reduction to such an extent that undesirable elements are reduced before or simultaneously with the manganese. Again, manganese is retained tenaciously by silicate slags. At high temperatures, manganese volatilizes.

In accordance with the present invention, thus, manganese concentrate may be derived from low content manganese compound silicate materials as indicated, and this so-separated manganese then may be formed into spiegeleisen, ferromanganese, etc. Thus, as a desirable aspect of the invention, steel manufacture may be facilitated by using more manganese and recovering the manganese which ordinarily has been lost, and recycling such manganese in the operation. This is notably feasible since it costs very little more to recover a large amount than a small amount from a slag.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

In general, the present operation, dealing with a compound silicate containing calcium, magnesium, manganese, iron and silica, involves first adjusting the composition of the raw material to a range of certain critical proportions as will be detailed hereinafter, and then the material is fired to pyrochemically displace the manganese and render it separable, as by grinding and treating by physical and/or chemical separating means, and then the manganese concentrates so obtained are converted to desired form.

To understand the chemical mechanism by which the manganese content may be properly dealt with in the present process, it is necessary to note some of the characteristics of reaction in slag chemistry. Slags, although chemically complex, on crystallizing will form relatively few minerals or crystal phases. This simplification of an otherwise complex chemical system results from the phenomenon of solid solution. In a solid solution an oxide of one kind can substitute in a crystal phase or mineral for other oxides of a similar nature. For instance $P_2O_5$ can substitute for $SiO_2$. MnO, FeO, and MgO can substitute for each other and in some instances for CaO. $Fe_2O_3$, $Al_2O_3$, and $Mn_2O_3$ can also substitute for each other.

I have found that slags which contain monticellite type silicate and a magnetic oxide do not have a manganese distribution favorable to the concentration of manganese. Apparently the manganese distributes itself between both the oxide and silicate according to a complex equilibrium. Also, I have found that when any ferrites develop, manganese cannot be concentrated and the attainment of any concentrate is very difficult.

But I have found that in a narrow and critical range, the lime, silica, and phosphorus oxides form a silicate which is relatively free from manganese, and the oxide will contain magnesium, iron, and manganese in a surprisingly removable form.

The chemical range through which my invention is operable may be defined as compositions of matter producing dicalcium silicate and a manganese-containing oxide. Alternatively, they might be defined as a composition in which the molar ratio of

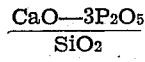

is ideally and preferably as 2:1. The invention is in general operable between ranges of 2.5:1 and 1.7:1 but deviations from the ideal to extreme ratios result in a decrease in recovery from about 94% to 50%.

In the practice of my invention with particular advantage I may utilize slag as it comes from open hearths or from old dumps. On an average such slag mixtures will require addition of from 5 to 20 parts limestone per hundred parts of slag for composition adjustment. Individual slags may require a silica addition and others may require more limestone. In any case the slag is crushed and metallic iron removed and the correcting material is added in to bring the $$\frac{CaO - 3P_2O_5}{SiO_2}$$

ratio to 2:1. The mixture is then pulverized to about −40 mesh, and is heated to a temperature of about 2550° F., and cooled slowly. This firing operation can be accomplished in a rotary kiln, reverberatory furnace, etc., as in known practices. The product of these operations should be coarsely crystalline dicalcium silicate, and a magnetic oxide of iron which has taken up the manganese.

After cooling, the slag is ground to about 200 mesh and passed over magnetic separators. These separators should give a tailing which is practically free of oxide, and a middling containing physically attached silicate and oxide, and a manganese concentrate relatively free from silicate. The middling can be re-ground and re-cycled to the separating circuit or to the furnace. The exact steps are subject to variations to give practically any degree of concentration desired.

It may be preferred to leave a small amount of the silicate in the concentrates. Such silicate will function as a flux and in subsequent reducing operation may serve a useful purpose.

This silicate will contain a small amount of undesirable phosphorus. It can easily be removed by making about a 30% slurry of the concentrate in water and adding enough acid to neutralize the CaO plus about a 10% excess and agitating for 10 to 20 minutes. If the concentrates are then separated, the lime, silica, and phosphorus will go to waste. Waste pickle liquors or any available acid may be used.

The concentrate will contain about 94% of the iron and manganese and magnesium oxides present in the original slag. Part of the alumina will be in the concentrates and part in the tailings. If the $$\frac{CaO - 3P_2O_5}{SiO_2}$$

ratio is carried on the high side, for example 2.1:1, the alumina will be more concentrated in the tailings; if on the low side, i. e. 1.9/1, in the concentrates. The tailings consist of a fine chemically active dicalcium silicate with P₂O₅ plus many trace elements. Its solubility and composition make it useful for agricultural liming of soil.

The concentrate may next be reduced to spiegeleisen by any convenient means such as blast furnace, electric furnace, etc. The particular alloy obtained will depend upon the ratio of iron and manganese in the original slag and upon conversion losses. Usually about 10% iron and 20% manganese will be lost in the overall processing.

The following example is illustrative of my invention. I take a mixture of flush and finishing slags, as coming from the furnace, having the following composition:

| | |
|---|---|
| SiO₂ | 22.8 |
| P₂O₅ | 2.14 |
| CaO | 32.6 |
| MnO | 11.7 |
| Al₂O₃ | 4.47 |
| FeO | 17.6 |
| MgO | 7.81 |

I correct as follows to a ratio of 2.1 to 1:

Molecular equivalent of CaO, 32.6÷56=.582
Molecular equivalent of SiO₂, 22.8÷60=.381
Molecular equivalent of P₂O₅, 2.14÷142=.015

$$\frac{CaO - 3(P_2O_5)}{SiO_2} = \frac{CaO - 3(.015)}{.381} = 2.1$$

CaO = .845 Molecular equivalent of CaO required
.582 Molecular equivalent of CaO in slag
———
Diff. .263 Molecular equivalent of CaO which must be supplied.

I add to 100 parts of slag, 25 parts of limestone which gives approximately .26 molar part or 14.6 parts by weight of CaO.

This mixture is ground to −40 mesh and fired to about 2550° F. for one hour and slowly cooled. It then comprises coarse dicalcium silicate in a matrix of very magnetic oxide. The clinker is as follows in composition:

| | |
|---|---|
| SiO₂ | 20.2 |
| P₂O₅ | 1.9 |
| CaO | 40.9 |
| Al₂O₃ | 3.9 |
| FeO | 15.6 |
| MgO | 6.9 |
| MnO | 10.4 |

From 100 parts of slag and 25 parts of limestone, I will obtain about 113 parts of clinker.

This clinker is ground to −200 mesh, made into a slurry with water and separated by magnetic means. Any middlings containing physically attached oxides and silicate may be reground and re-cycled. The resultant product should contain more than 90% oxide and less than 10% silicate.

Other modes of applying the principle of the invention may be employed, change being made as regards the details described, provided the features stated in any of the following claims or the equivalent of such be employed.

I therefore particularly point out and distinctly claim as my invention:

1. In a process of obtaining an oxide of manganese from solid compound silicate material containing calcium, iron and manganese, adding a material selected from the group consisting of oxygen-containing calcium and silicon materials to said silicate material to give the mixture a molar ratio $$\frac{CaO - 3P_2O_5}{SiO_2}$$

which is more than 1.7 to 1 but less than 2.5 to 1, heating the mixture to a temperature to produce dicalcium silicate and a magnetic manganese and iron oxide portion, cooling said heated material, grinding the same, and recovering said manganese and iron oxide portion.

2. In a process of obtaining an oxide of manganese from solid compound silicate material containing calcium, iron, manganese and phosphorus, adding a material selected from the group consisting of oxygen-containing calcium and silicon materials to said silicate material to give the mixture a molar ratio $$\frac{CaO - 3P_2O_5}{SiO_2}$$

which is more than 1.7 to 1 but less than 2.5 to 1, heating the mixture to a temperature to produce dicalcium silicate and a magnetic manganese and iron oxide portion, cooling said heated material, grinding the same, and recovering said manganese and iron oxide portion.

3. In a process of obtaining an oxide of manganese from solid slag comprising a compound silicate material containing calcium, iron and manganese, adding a material selected from the group consisting of oxygen-containing calcium and silicon materials to said slag material to give the mixture a molar ratio $$\frac{CaO-3P_2O_5}{SiO_2}$$

which is more than 1.7 to 1 but less than 2.5 to 1, heating the mixture to a temperature to produce dicalcium silicate and a magnetic manganese and iron oxide portion, cooling said heated material, grinding the same, and recovering said manganese and iron oxide portion.

4. In a process of obtaining an oxide of manganese from solid open hearth slag, adding a material selected from the group consisting of oxygen-containing calcium and silicon materials to said slag material to give the mixture a molar ratio $$\frac{CaO-3P_2O_5}{SiO_2}$$

which is more than 1.7 to 1 but less than 2.5 to 1, heating the mixture to a temperature to produce dicalcium silicate and a magnetic manganese and iron oxide portion, cooling said heated material, grinding the same, and recovering said manganese and iron oxide portion.

5. In a process of obtaining an oxide of manganese from solid open hearth slag, adding a material selected from the group consisting of oxygen-containing calcium and silicon materials to said slag material to give the mixture a molar ratio $$\frac{CaO-3P_2O_5}{SiO_2}$$

which is more than 1.7 to 1 but less than 2.5 to 1, heating the mixture to a temperature of about 2550° F. for about one hour to produce dicalcium silicate and a magnetic manganese and iron oxide portion, cooling said heated material, grinding the same, and recovering said manganese and iron oxide portion.

6. In a process of obtaining an oxide of manganese from solid open hearth slag, adding a material selected from the group consisting of oxygen-containing calcium and silicon materials to said slag material to give the mixture a molar ratio $$\frac{CaO-3P_2O_5}{SiO_2}$$

which is more than 1.7 to 1 but less than 2.5 to 1, grinding such mixture to about −40 mesh, heating the mixture to a temperature to produce dicalcium silicate and a magnetic manganese and iron oxide portion, cooling said heated material, grinding the same, and recovering said manganese and iron oxide portion.

7. In a process of obtaining an oxide of manganese from solid open hearth slag comprising compound silicate material containing calcium, iron and manganese, adding a material selected from the group consisting of oxygen-containing calcium and silicon materials to said slag material to give the mixture a molar ratio $$\frac{CaO-3P_2O_5}{SiO_2}$$

which is more than 1.7 to 1 but less than 2.5 to 1, grinding such mixture to about −40 mesh, heating the mixture to a temperature of about 2550° F. for about one hour to produce dicalcium silicate and a magnetic manganese and iron oxide portion, cooling said heated material, grinding the same, and recovering said manganese and iron oxide portion.

8. In a process of obtaining an oxide of manganese from solid open hearth slag comprising compound silicate material containing calcium, iron, manganese and phosphorus, adding a material selected from the group consisting of oxygen-containing calcium and silicon materials to said slag material to give the mixture a molar ratio $$\frac{CaO-3P_2O_5}{SiO_2}$$

which is more than 1.7 to 1 but less than 2.5 to 1, grinding such mixture to about −40 mesh, heating the mixture to a temperature of about 2550° F. for about one hour to produce dicalcium silicate and a magnetic manganese and iron oxide portion, cooling said heated material, grinding the same, and recovering said manganese and iron oxide portion.

9. In a process of obtaining an oxide of manganese from solid compound silicate material containing calcium, iron and manganese in a molar ratio $$\frac{CaO-3P_2O_5}{SiO_2}$$

of between 2.5 and 1.7 to 1, the steps comprising heating the material to a temperature of about 2550° F. to produce dicalcium silicate and a magnetic manganese and iron oxide portion, cooling said heated material, grinding the same, and recovering said manganese and iron oxide portion.

ROBERT A. SCHOENLAUB.

REFERENCES CITED

The following references are of record in the file of this patent:

UNITED STATES PATENTS

| Number | Name | Date |
| --- | --- | --- |
| 556,457 | Cabot et al. | Mar. 17, 1896 |
| 2,132,404 | Dean | Oct. 11, 1938 |
| 2,352,712 | Heckett | July 4, 1944 |
| 2,353,613 | Gardner | July 11, 1944 |
| 2,409,428 | Gardner | Oct. 15, 1946 |
| 2,471,562 | Fitterer | May 31, 1949 |

OTHER REFERENCES

"Chemical Abstracts," vol. 22, page 3380, Some Constituents of Open Hearth Slags, by J. M. Ferguson (1928).

1948 Open Hearth Proceedings, vol. 31, pages 194–200, published by A. I. M. M. E.